March 8, 1949.    H. JENSEN    2,463,695
BEARING SEAL
Filed Oct. 18, 1945    2 Sheets-Sheet 1
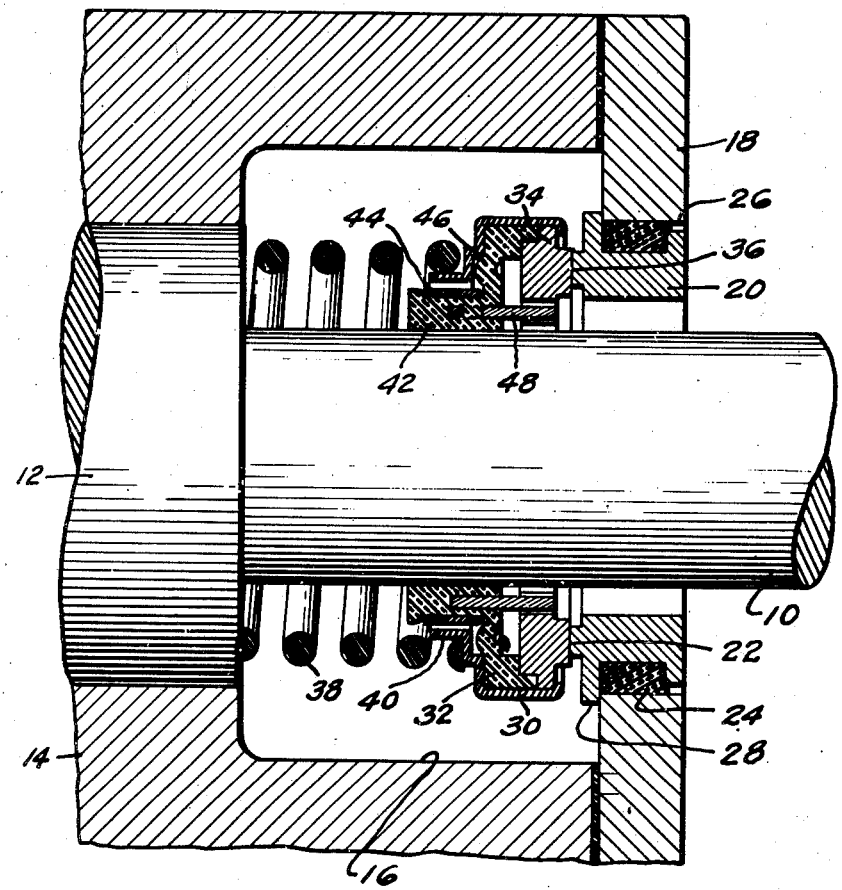
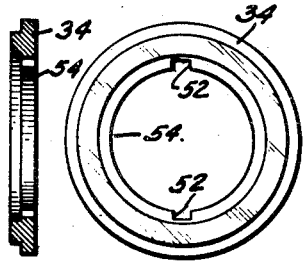
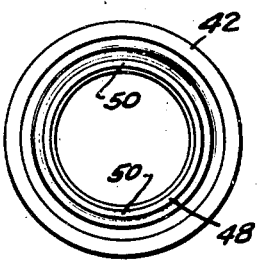
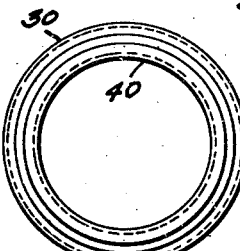
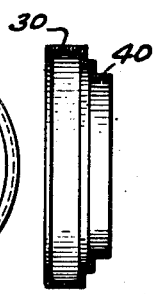
INVENTOR
HANS JENSEN
BY Harry H. Hitzeman
ATTORNEY.

March 8, 1949. H. JENSEN 2,463,695
BEARING SEAL
Filed Oct. 18, 1945 2 Sheets-Sheet 2
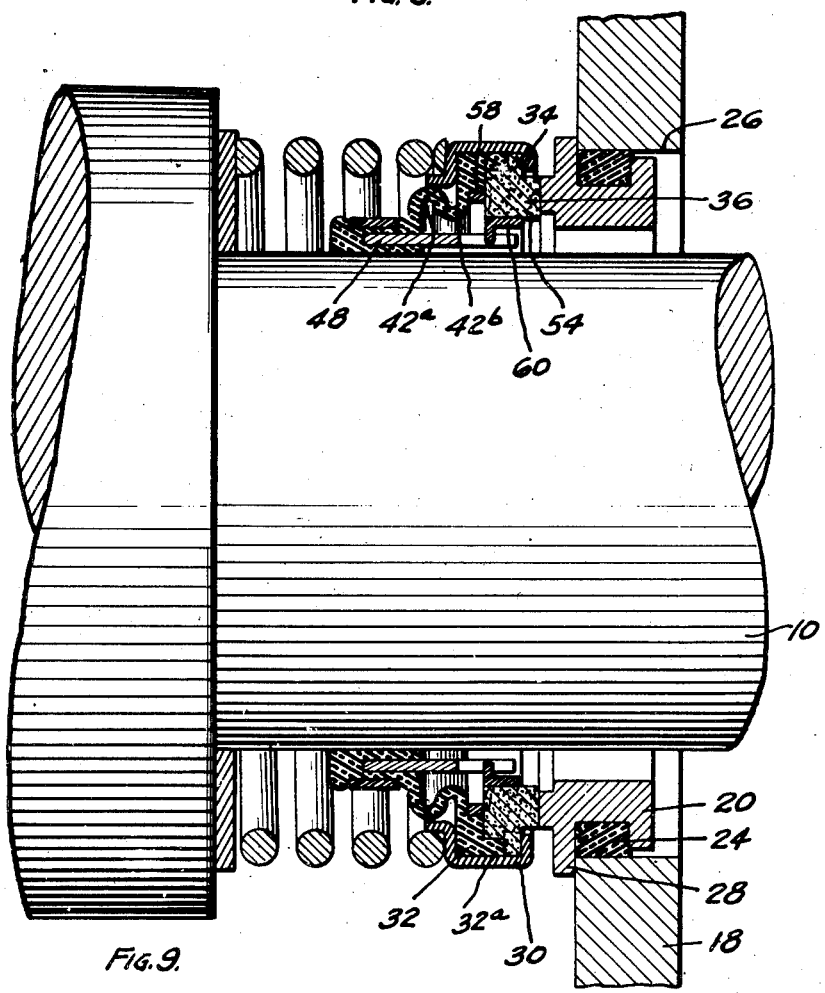
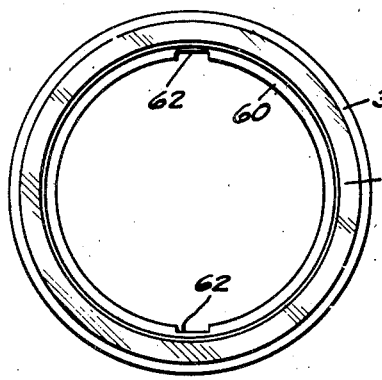
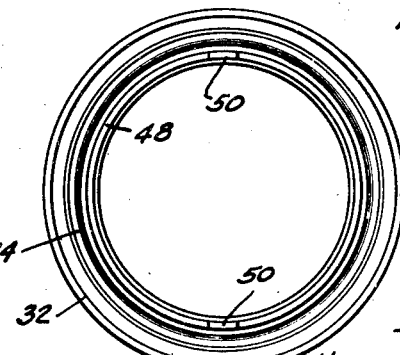
INVENTOR
HANS JENSEN
By Harry H. Hitzeman
ATTORNEY.

Patented Mar. 8, 1949

2,463,695

UNITED STATES PATENT OFFICE 2,463,695

BEARING SEAL

Hans Jensen, Arlington Heights, Ill., assignor to Modern Design Products Company, Chicago, Ill., a corporation of Illinois Application October 18, 1945, Serial No. 623,090

4 Claims. (Cl. 286—11)

My invention relates to bearing seals and similar devices. My invention relates more particularly to sealing devices or sealing means adapted to form a fluid seal between two relatively rotated parts.

The principal object of the present invention is to provide a new and improved seal unit adapted to be fastened on a shaft with a yieldingly held bearing nose bearing against a surface for preventing the leakage of fluid past the bearing surfaces or the relatively rotatable parts.

A further object of the present invention is to provide the combination in a unit seal of a flexible diaphragm to compensate for a longitudinal movement of the shaft during operation and a positive connection between the diaphragm and the bearing nose for effecting rotary movement to the bearing nose in cooperation with the shaft upon which the diaphragm is firmly affixed.

A further object of the invention is to provide an improved unit seal of the type described, so constructed that it can be easily removed for cleaning, repair or replacement yet capable of long and hard usage without becoming broken or out of order.

Other objects and advantages will be more apparent from the following description wherein reference is had to the accompanying two sheets of drawings upon which:

Fig. 1 is a vertical sectional view illustrating a sealing unit as applied to a pump shaft or similar construction.

Fig. 2 is a front elevational view of the sealing nose.

Fig. 3 is a cross sectional view thereof.

Fig. 4 is a front elevational view of the flexible diaphragm.

Fig. 5 is a cross sectional view thereof.

Fig. 6 is a front elevational view of the shell or housing which I employ.

Fig. 7 is a cross sectional view of the same.

Fig. 8 is a cross sectional view similar to Fig. 1 of a modified form of construction.

Fig. 9 is a front elevational view of the bearing nose and driving ring associated therewith; and Fig. 10 is a front elevational view of the flexible diaphragm and associated parts.

In the embodiment of the invention which I have chosen to illustrate, I have shown a rotatable shaft 10 which may be a part of a compressor or pump mechanism having an enlarged portion 12. The shaft may extend through the compressor or pump mechanism housing 14 and through an opening 16 therein, over which a cover plate 18 may be provided. I provide a sealing ring 20 of suitable bearing material having the lapped sealing face 22 and provided with a ring 24 of resilient material, so that the same may be effectively fastened into the bore 26 with an edge 28 bearing against the inner surface of the plate 18 for suitable heat dissemination from the bearing ring.

The self-contained sealing unit may include the shell or housing 30 which fastens together the diaphragm member 32 and the bearing nose 34, the bearing nose 34 also having a lapped face 36 which engages the lapped face 22 of the sealing ring 20. A coiled spring member 38 positioned between the shoulder 12 of the shaft 10 and a collar portion 40 of the shell 30 normally holds the sealing unit in frictional engagement with the ring 20.

To compensate for effective sealing, due to longitudinal movement and for slightly off center rotation of the shaft 10, I provide a sleeve portion 42 on the diaphragm 32 frictionally fastened to the shaft 10 by means of an engaging ring 44. The lateral flange 46 of the diaphragm may have one or more grooves therein to permit back and forth movement of a portion of the diaphragm while the balance is stationary with respect thereto.

I provide a direct drive for rotating the bearing nose 34 from the diaphragm 32. This may include a metal ring 48 carried by and molded into the sleeve portion 42 of the diaphragm 32. The ring may have a pair of extended fingers 50 which engage in suitable slots 52 in the inner bore 54 of the sealing nose 34. By this construction as the bearing seal unit is rotated with the shaft 10 there is a positive rotary drive for the bearing nose 34 and as the shaft moves back and forth longitudinally the fingers will extend or withdraw in the slots 52 without effecting the rotary driving effort of the same.

In the modified construction which I have shown in Fig. 8, I have provided a bellows in the diaphragm 32 to provide for comparatively greater accommodation in longitudinal movement of the shaft whenever it is necessary. I have also provided a ring member 58 for locking the shoulder 32a of the diaphragm 30 effectively in the shell or housing 30. In addition, I have provided a ring member 60 secured to the inner bore 54 of the sealing nose 34, the ring member being provided with the slots 62 to receive the fingers 50 of the ring 48 carried by the diaphragm.

From the above and foregoing description it can be seen that I have provided a comparatively simple construction of bearing seal which may be easily and simply installed and which, when broken or worn out, may be easily and simply removed and a new unit seal provided as a substitute. The seal is placed upon the shaft by pressing the same over the end thereof, it being frictionally held as previously described by means of the sleeve 42 of the flexible diaphragm and the retaining ring 44.

While I have illustrated and described a specific embodiment of the invention, it will be apparent to those skilled in the art that changes and modifications may be made in the exact details shown and I do not wish to be limited in any particular; rather what I desire to secure and protect by Letters Patent of the United States is:

1. In a sealing assembly for preventing a flow of fluid along the surface of a cylindrical shaft, a cylindrically shaped housing adapted to loosely encircle said shaft, said housing formed of sheet metal, a diaphragm member and bearing nose fastened therein, said diaphragm having a sleeve portion adapted to frictionally fit on said shaft, a band about said sleeve portion, a ring embedded in said sleeve portion, fingers extending therefrom, and slots in said bearing nose engaged by said fingers to rotate said bearing nose with said shaft yet permit limited longitudinal movement between said diaphragm and said bearing nose.

2. In a sealing assembly for preventing a flow of fluid along the surface of a cylindrical shaft, a cylindrically shaped housing adapted to loosely encircle said shaft, said housing formed of sheet metal, a diaphragm member and bearing nose fastened therein, said diaphragm having a sleeve portion adapted to frictionally fit on said shaft, flexible bellows forming a portion of said sleeve, a band about said sleeve portion, a ring embedded in said sleeve portion, fingers extending therefrom, and slots in said bearing nose engaged by said fingers to rotate said bearing nose with said shaft yet permit limited longitudinal movement between said diaphragm and said bearing nose.

3. In a sealing assembly for preventing a flow of fluid along the surface of a cylindrical shaft, a cylindrically shaped housing adapted to loosely encircle said shaft, said housing formed of sheet metal, a diaphragm member and bearing nose fastened therein, a ring carried by said bearing nose, slots therein, said diaphragm having a sleeve portion adapted to frictionally fit on said shaft, flexible bellows forming a portion of said sleeve, a band about said sleeve portion, a rigid ring embedded in said sleeve portion, fingers extending therefrom, the slots in the ring carried by said bearing nose engaged by said fingers to rotate said bearing nose with said shaft yet permit limited longitudinal movement between said diaphragm and said bearing nose.

4. In a sealing assembly for preventing a flow of fluid along the surface of a cylindrical shaft, a cylindrically shaped housing adapted to loosely encircle said shaft, said housing formed of sheet metal, a diaphragm member and bearing nose fastened therein, a ring carried by said bearing nose, slots therein, said diaphragm having a sleeve portion adapted to frictionally fit on said shaft, a band about said sleeve portion, a rigid ring embedded in said sleeve portion, fingers extending therefrom, the slots in the ring carried by said bearing nose engaged by said fingers to rotate said bearing nose with said shaft yet permit limited longitudinal movement between said diaphragm and said bearing nose and spring means for holding said assembly against a bearing surface surrounding said shaft.

HANS JENSEN.

REFERENCES CITED

The following references are of record in the file of this patent:

UNITED STATES PATENTS

| Number | Name | Date |
| --- | --- | --- |
| 2,347,118 | Matter | Apr. 18, 1944 |
| 2,362,854 | Stephens | Nov. 14, 1944 |
| 2,365,351 | Matter | Dec. 19, 1944 |
| 2,373,463 | Curtis | Apr. 10, 1945 |
| 2,375,085 | Curtis | May 1, 1945 |

FOREIGN PATENTS

| Number | Country | Date |
| --- | --- | --- |
| 499,879 | Germany | 1930 |